June 14, 1938.  H. W. HANNA  2,120,747
SLIDE VEHICLE
Filed Dec. 13, 1937
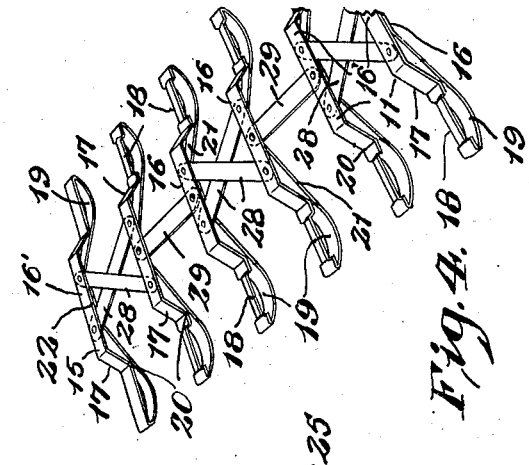
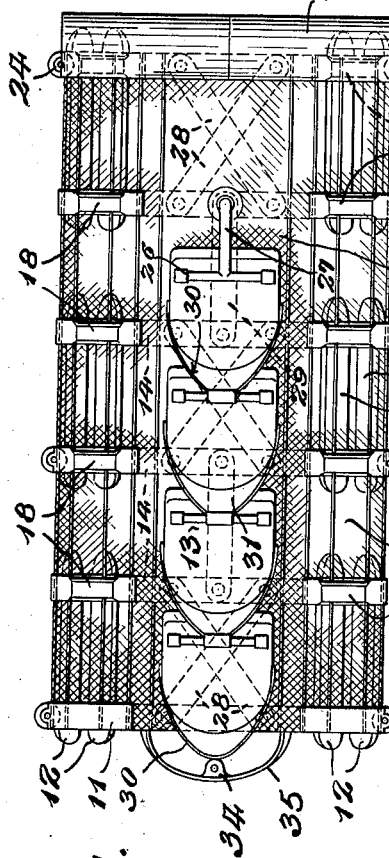
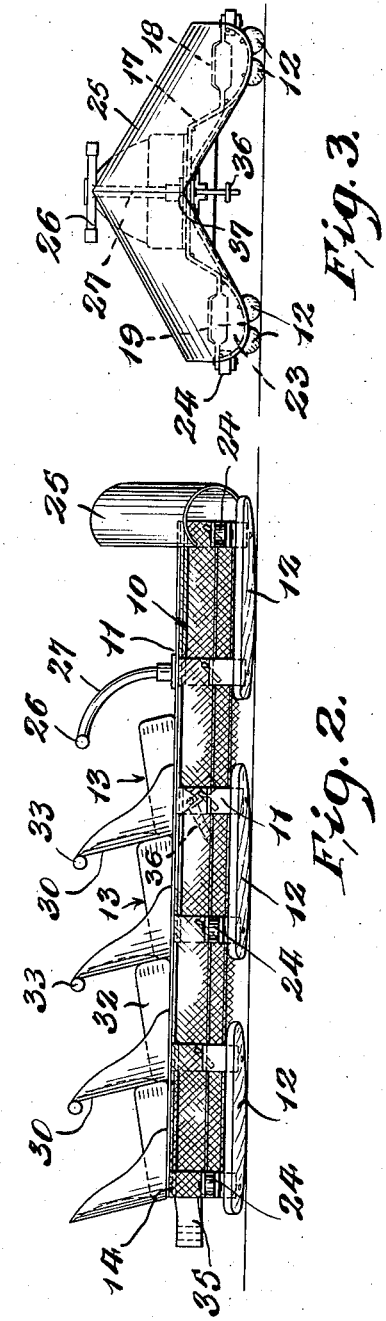
INVENTOR.
Horace Wm. Hanna,
BY Christian R. Nielsen.
ATTORNEY.

Patented June 14, 1938

2,120,747

UNITED STATES PATENT OFFICE 2,120,747

SLIDE VEHICLE

Horace William Hanna, New York, N. Y., assignor of one-half to Kathie Malik, New York, N. Y.

Application December 13, 1937, Serial No. 179,563

9 Claims. (Cl. 280—15)

The invention relates to vehicles and particularly to those of the bob-sled type especially adapted for amusement purposes.

On account of the heavy loads which these devices are called upon to carry, the high speeds which they attain, and the severe stresses they must sustain in addition by reason of the abrupt turns and undulations in runways, as well as the fact that upsets and collisions must be reckoned as certain incidents of the use of such devices, these vehicles are required to be very strong, and to be adapted to sustain severe shocks with a minimum of injury.

It is therefore an object of the invention to present a construction which may be embodied in a very light weight and which will at the same time be extremely rugged and damage proof, while functioning with advantage in several important respects. Among the latter is the adaptation of the structure to permit a construction with more than two trucks, which will still permit all trucks to carry a proportionate part of the load and remain in full load-sustaining relation with the surface of the runway, and which will also have horizontal sinuosity, for the purposes to be described.

Another object is to present a novel construction in runner mountings and truck elements having special value and advantage in devices of this general kind. Another aim is to present a novel construction of sled for use on wood or metal or other artificial runways lubricated or not, and specially adapted to remain on the runway, with a minimum of guidance and a maximum of safety. It is also an important object to present a construction having a novel guiding function by which it may be steered by the passengers. Another important aim is to present a novel body floor construction.

Additional objects, advantages and features of invention reside in the construction, arrangement and combination of parts, involved in the embodiment of the invention, as will be understood from the following description and accompanying drawing, wherein Figure 1 is a plan view of a sled constructed in accordance with my invention.

Figure 2 is a side elevation thereof.

Figure 3 is a front end view of the sled.

Figure 4 is a perspective view of the framing with the runners and body parts removed.

There is illustrated a sled comprising a floor and body piece 10 formed of woven wire, preferably a heavy wire weave with a mesh of about one inch, or possibly slightly more, or possibly less. This is supported on trucks 11, having runners 12, and over it are mounted a series of seats 13 arranged longitudinally of the sled.

Each truck consists of two cross frames 14, consisting of a top bar 15 and a bottom bar 16, both of which may be formed from one piece of heavy strap metal, if desired. The middle portion 16' of each bar 15 is extended horizontally and transversely of the sled across the medial longitudinal line thereof; the outer end portions of the bar are bent diagonally downward as at 17, and then extended horizontally outward forming steps or stirrups 18 and immediately outward of the step the material of the bar end portions is bent downwardly and extended on a curve beneath the step at 19 and thence upward, contacting the angle 20 at the junction of the step and the inclined part 17 of the bar 15, and being thence continued rectilinearly inwardly and upwardly as at 21 and secured against the under side of the central part 16' of the bar 15, as at 22.

The wire net material is closely fitted to the upper sides of these bar portions 16, to the downwardly inclined parts 17 and to the curved parts 19, being secured at proper intervals. In this way, the stirrups 18 are disposed over a channel 23 running the full length of the sled, and adapted to accommodate the heels and calves and garments of the passengers, as will be explained. The central portions of the stirrups except on the rearmost cross frame are twisted through a one-eighth turn counterclockwise, as viewed from the right hand side of the sled, accommodating the stirrup to the instep of the passengers.

In each truck, there are shown two runners at each side, four to a truck, extending foreand-aft. They are secured to the under sides of the curved parts 19, side by side with a slight space between, and on each side of the lowermost parts of the curved parts 19. These runners may be made of various materials suitable for the particular uses contemplated, woods and metals of various kinds having been used, and for use in a polished surface chute of wood or metal runners of cocoanut fiber have been employed, and various other materials may be employed, as will be understood. On certain of the cross frames at their lateral extremities there are mounted buffer rollers 24, these rollers being suitably located at longitudinally spaced points along the sled to engage the sides of a chute to guide the sled in tortuous runways, and due to the nature of the wire fabric of the floor, the sled is capable of being longitudinally curved horizontally when taking a sharp curve at high speed by being forced against the outer concave side of the chute by centrifugal force incident to the movement of the sled in such manner. The rollers near the ends will engage the sides of the chute, and the central part of the sled will be forced outwardly by centrifugal force, the intermediate roller or rollers serving to then engage when the sled conforms to the outer curve of the chute.

The sled is formed with a dash 25 at the front, of approved form, and any suitable material adapted to the purpose.

The seats are each located over respective cross frames of the trucks and may be secured in any approved manner to these frames. The particular sled as described has three trucks and six cross frames. There are four seats, one over each of the rearmost four cross frames, the space over the front truck being open. Over the second cross frame of the front truck there is mounted a grip bar 26, convenient to the front seat, and this may be carried on a stem 27, extended forwardly and curved downwardly to the cross frame, to which it may be secured as desired. The cross frames of each truck may be mutually connected by diagonals 28 for lateral rigidity of each truck, but mutually adjacent trucks are connected by links 29 pivoted to the cross frames. In this manner, each two trucks may have limited pivotal movement with respect to each other, opposed by the elastic floor and side netting. But an important function of the pivotal link connection between the trucks is to permit relative lateral displacement of the middle truck slightly when the sled rounds a curve and centrifugal force causes the middle one to swing outward as the fore and aft rollers 24 engage the sides of the chute.

Each of the seats 13 includes a rigid back piece 30, secured to the cross frame, and a suitable padding 31 may be provided on the back as shown. A cushion 32 is indicated as proper, but this seat may be of any approved material. Secured across the top portion of the back of each of the forward three seats there is a grip bar 33 similar to the one 26, so that the passenger in each seat thus has a grip bar to which he may hold.

At the back of the sled, a coupling eye 34 is mounted on a bowed bar 35, secured to the last cross frame of the rear truck, so that a second sled may be coupled to the first, if desired, by any approved coupling link, not shown. Under the forward cross frame of the second truck of the sled there is pivoted a pendant draw bar 36, adapted to be engaged by a suitable draft member for hauling the sled up inclines, or to connect with a link to the coupling eye of another sled.

By disposing the strands of the wire net material diagonally of the sled and forming a square mesh in this fabric, the body of the sled is securely braced against excessive distortion and tends normally to assume a straight course relation with the trucks notwithstanding its yielding to the extent indicated above, and shocks of collisions are greatly cushioned, reduced or eliminated by the use of this fabric as the principal longitudinal body element of the sled.

By the construction shown, each cross frame is constructed integrally from a single piece of strap metal, and a minimum number of fastenings are involved throughout the assembly of the sled, as will be apparent.

In the construction of the sled, in order to get the wire net material over the central portions and side portions 17, and yet have the stirrups over the side channels 23, the netting may be applied after forming of the central upper portions of the cross frame including the stirrup portions, and after slots are cut in the net material at proper intervals, the end portions of the cross frame members may be inserted through the slots and the netting drawn to proper position thereon, after which the lower parts of the cross frames may be formed and connected to the other parts. Except where pivotal joints are indicated, the connections may be welded joints, including those at the ends of the diagonals 28.

In the use of this sled the passengers are seated in the familiar way common in bob sleds, the legs of each passenger extending forwardly beside the next passenger in front, and the feet being set on the first or second stirrup 18 ahead. The dash 25 extends below and above the feet of the foremost passenger, and is inclined upwardly from each side to a high point over the longitudinal axis of the sled so that it affords a wind break for the body of the first passenger. Its lower edge at the middle extends to the elevated floor part 37 of the net sheet, over the parts of the trucks. This leaves ample clearance beneath the body of the sled.

The sled may be adapted to use on actual snow runs by providing the proper style of runners 12. Where the sled requires guiding by a steersman on the sled itself, the bar 26 may be utilized for this purpose to attain the moderate steering action required on the usual bob sled run.

When the device is employed on an artificial chute of wood or metal, which is the special use contemplated for the present embodiment, the sled is usually hoisted to a high point on the chute by an endless chain with grabs or dogs adapted to engage the draw-bar 36, and which will release therefrom when the sled reaches an incline down which it may move by gravity. The chutes for such use may be constructed with the usual banked turns so that this sled will be guided therethrough and will accommodate itself to the form of the surfaces of the chute as described.

It will be noted that by the construction described, the advantages of a raised frame-work for the seats is attained without requiring the use of truss or stay members in the body structure, and permits the described flexibility of conformation of the sled body to chute contours without weakness or liability of collapse. Furthermore, in the event of collisions, the sled is adapted to withstand strains with a minimum of injury and may be readily repaired in case of distortion beyond the limits of its elasticity. This elasticity of the body structure is an important element of advantage in the various functions of the structure which are expected. Another important advantage of the invention is the absence of structural members in the sled which are liable to fracture or splintering, so that in collisions liability of injuries to passengers from these is eliminated.

While I have described and shown a specific embodiment of the invention, I do not regard the invention as being limited to the exact details of structure and arrangement disclosed, and various modifications of the construction may be made without departing from the spirit of the invention as set forth in the appended claims.

It will be noted that the weight of the load on the sled will have a steering effect when the sled traverses a turn, by reason of the end trucks being held while the central part of the body may bend outwardly, causing the ends to turn inwardly slightly.

The pressure of the leading passenger's feet on the stirrups will also contribute to a steering effect. All of these steering effects minimize the side thrust of the sled against the sides of a chute.

I claim:—

1. A sled comprising a plurality of trucks, and an elastic sheet floor and body member laid over and secured thereto so as to hold the trucks yieldingly in a predetermined straight course relation, seats secured over the sheet and to the trucks, foot rests on the trucks, and hand grip devices secured to the trucks in advance of the seats.

2. A sled for the uses described comprising a plurality of cross frames, a plurality of longitudinally spaced runners secured to the extremities of the frames, and a sheet of woven elastic wire secured to the cross frames in such relation as to hold the frames in a predetermined straight course relation yieldable to loads and centrifugal force to conform to curves of runways in vertical and horizontal directions.

3. The structure of claim 2 in which the trucks have elevated central portions, and said sheet is extended over the central portions to form a floor, and downwardly beside the central portions to form side portions, and outwardly to form foot and leg receiving parts.

4. The structure of claim 2 in which the said frames have foot stirrups at their outer parts over the said sheet, said sheet being extended thereunder to form foot and leg receiving parts at the sides of the sled.

5. The structure of claim 2 in which the trucks have elevated central portions, downwardly inclined intermediate side portions, stirrups extended laterally from the lower parts of said side portions, and downwardly, inwardly and upwardly curved end portions, said sheet being laid over the said central portions and side portions, under said stirrups and over said curved parts.

6. The structure of claim 2 in which seats are secured to certain of said frames, and hand grip devices to other frames in advance of the seats.

7. The structure of claim 2 in which the trucks have elevated portions, downwardly inclined intermediate side portions, stirrups extended laterally from the lower parts of said side portions, and downwardly, inwardly and upwardly curved end portions, said sheet being laid over the central portions and side portions, under said stirrups and over said curved parts, said runners including pairs of parallel members on each side of the sled connected to the said curved parts of at least two cross frames.

8. In a sled of the character described, a cross frame member comprising a single length of strap metal having a central rectilinear horizontal part, end portions bent downwardly therefrom and thence outwardly to form stirrups, the material outwardly of the stirrups being bent downwardly, inwardly and upwardly to lower runner mountings and the extremities being secured to the central part.

9. The structure of claim 8 in which the said upwardly bent material is secured to the material at the junction of the stirrup and the downwardly bent part.

HORACE WM. HANNA.